Dec. 12, 1944.  N. J. MARSHALL  2,364,991
WATERING DEVICE
Filed Aug. 4, 1942
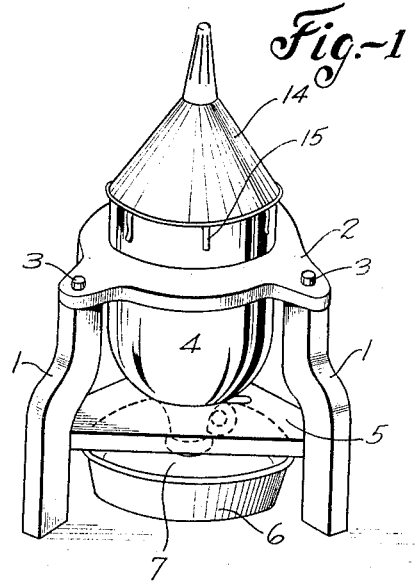
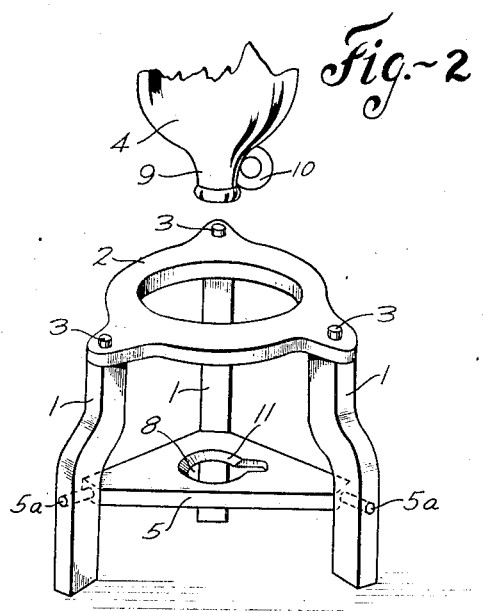
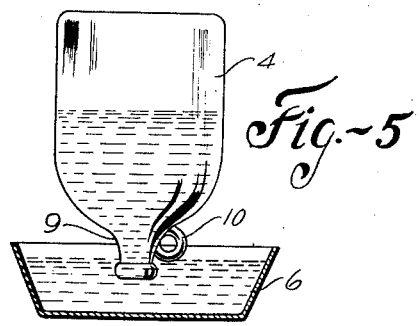
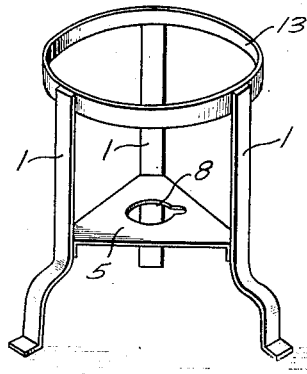
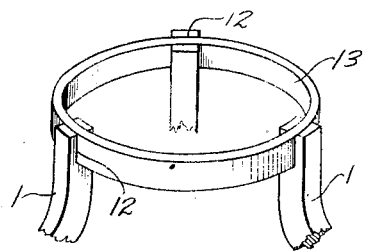
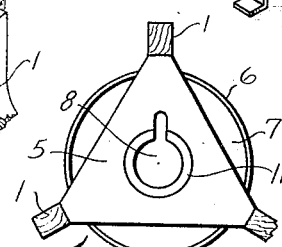

Patented Dec. 12, 1944

2,364,991

UNITED STATES PATENT OFFICE 2,364,991

WATERING DEVICE

Nicholas J. Marshall, New Bremen, Ohio

Application August 4, 1942, Serial No. 453,535

7 Claims. (Cl. 119—77)

This invention pertains to poultry drinking fountains, and more particularly to a barometric type device wherein the water supply in the dispensing tray or trough is automatically replenished from an inverted vessel, the mouth of which is submerged in the water supply in the tray.

It has long been more or less common practice to mount an ordinary Mason jar in inverted position directly upon the dispensing pan by a screw thread coupling, or to support a milk bottle or other vessel in like manner. Such assemblies are, however, of limited capacity and usually unstable, and likely to be upset or the water supply polluted.

In the present instance there is contemplated the use of a conventional earthenware or glass jug of large capacity, having the customary integral ring handle as a reservoir. The reservoir jug is removably mounted in a rack or stand entirely independently of the dispensing tray or trough. The rack is shaped to support the reservoir jug beyond and independently of the tray or trough, in such relation as to compensate for the elevated center of gravity of the jug when full of water, and therefore affords increased stability. For convenience of storage or shipment, the supporting rack or stand is preferably, but not necessarily, of knock-down or collapsible character. A funnel, when not being used to fill the reservoir jug, is duo-functionally employed in inverted position on top of the inverted jug to exclude chickens from roosting on the fountain.

The object of the invention is to improve the construction of reservoir type chicken watering fountains and feeders, or the like, whereby they may not only be economically manufactured, but will be more efficient in use, of increased capacity, adapted to the use of an ordinary ring handle jug, or similar vessel, as a reservoir.

A further object of the invention is to provide a stand or rack for support of a water filled jug, comprising a fountain reservoir in elevated position wholly independently of the associated dispensing tray or trough and outside thereof.

A further object of the invention is to protect the dispensing trough or tray of such unit against entrance of litter and trash.

A further object of the invention is to provide a knock-down or collapsible type supporting rack or stand for the reservoir jug which may be compactly arranged for storage or for shipment.

A further object of the invention is to provide a rack or stand for a reservoir type drinking fountain having the advantageous structural features and inherent meritorious characteristics herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the drawing, wherein is shown the preferred but obviously not necessarily the only form of embodiment of the invention, Fig. 1 is a perspective view of an assembled poultry fountain including a knock-down stand or rack of wood construction, in which the present invention is embodied.

Fig. 2 is a perspective view of the supporting rack, from which the reservoir jug has been removed.

Fig. 3 illustrates a modification of the method of assembling the rack.

Fig. 4 is a perspective view of a supporting rack for the present assembly constructed of metal parts.

Fig. 5 is a somewhat diagrammatic view showing the relation of the reservoir jug and the dispensing pan removed from the rack.

Fig. 6 is a section view taken on a plane above the shelf 5 in Fig. 1 with the jug omitted.

Like parts are indicated by similar characters of reference throughout the several views.

Drinking fountains and feeding devices of the reserve supply or reservoir type, wherein the flow from the reservoir to a dispensing trough is automatically regulated, are quite well known. However, heretofore such units have been of limited capacity and unstable when filled, having exposed dispensing trough or tray likely to collect litter and debris, and providing a convenient roosting place. The present embodiment enables the use of a readily available conventional jug as a reservoir of increased capacity, and supports the reservoir independently of the dispensing vessel in such relation as to maintain the dispensing vessel partially covered yet easily accessible, and of such construction as to permit the support to be collapsed into compact form for storage or shipment. Under present day scarcity of metals and restrictions upon their use, the present design of supporting rack readily lends itself to the use of wood.

As illustrated in the drawing, the rack includes relatively spaced upright legs 1—1 of substantially ogee form, which afford a wide spreading support which will resist capsizing. These legs may be sawed from wood, preferably plywood or laminated material. Interconnecting the legs 1 at their tops is a collar 2 of wood, also preferably but not necessarily plywood construction. The collar 2 is detachably engaged with the ends of the legs 1 by dowel pins 3—3. The spacing of the legs and size of the collar 2 are such as to readily receive a conventional glass or earthenware jug 4 in inverted position to serve as a supply reservoir. To support the jug 4 in inverted upright position, there is detachably engaged with the legs 1 in spaced relation with the collar 2, a polygonal shelf 5. The shelf 5 is spaced a sufficient distance above the ground to permit the free insertion and removal of a dispensing tray 6 beneath the shelf 5 and is detachably connected to the legs 1 by dowel pins 5a. The shelf 5 serves as a cover for the dispensing tray to exclude litter and dirt. However, marginal segments of the tray 6 project at 7 sufficiently beyond the margins of the polygonal shelf 5 to permit easy access of chickens or small animals for drinking purposes. The dispensing tray 6 rests directly upon the ground, and the supply reservoir 4 is supported entirely independently thereof. Centrally disposed in the shelf 5 is a key hole shaped opening 8 of sufficient size to permit the insertion of the neck 9 of the inverted reservoir jug and the integral ring handle 10. The upper margin of the opening 8 is beveled at 11 to enable the neck 9 of the jug to project therethrough to a plane below the liquid level of the dispensing tray in substantially the relation illustrated in Fig. 5. If the neck is sufficiently long, the jug may be locked in position by a partial rotation by which the handle ring is turned out of registry with the elongated portion of the opening 8. However, such interlock is not essential.

As a modification of the mode of detachably interconnecting the surrounding collar or ring 2 and the supporting legs, the upper ends of the legs may be slotted as shown at 12 in Fig. 3 to removably receive therein a hoop 13.

In lieu of the use of wood as construction material, the entire rack may be formed from metal as shown in Fig. 4.

Chickens are quite likely to roost upon a drinking fountain of whatever construction, tending to upset the unit and to pollute the water in the dispensing tray. In the present instance a funnel 14 is quite desirable for filling the reservoir jug, and when not being so used is mounted on top of the inverted reservoir jug, as is shown in Fig. 1. The margin of the funnel is provided with a dependent band or with spring fingers 15 which overlap the sides of the jug and removably maintain the funnel in position. The tapered sides and upstanding stem of the funnel affords no place of lodgment for roosting hens, and at the same time keeps the funnel in convenient position for use in replenishing the contents of the reservoir jug.

While the unit is described as a poultry watering device, it is to be understood that it is applicable for dispensing food mixtures and for feeding and watering small animals as well as poultry.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms of modifications within the legitimate and valid scope of the appended claims.

Having thus described my invention, I claim:

1. A chicken watering fountain or the like, wherein an inverted small mouth jug is employed as a reservoir, a supporting frame including vertical spaced legs, an annular band connecting the legs of their tops and surrounding the reservoir jug, and a polygonal shelf interconnecting the legs in spaced relation with their lower ends and having therein a centrally disposed key hole slot to receive the neck and conventional ring handle of the jug, the spacing of the legs and proportioning of the polygonal shelf being such as to afford access to segmental portions of a round tray positioned between the legs beneath the shelf and projecting therebeyond at spaced intervals.

2. A knock-down supporting rack for a chicken watering fountain, comprising a plurality of upright wooden legs of approximately ogee form, a wooden ring detachably carried by the upper ends of the legs, and a triangular shelf detachably connected with the legs in spaced relation with their lower ends to support a reservoir within the ring, and restricting access to a circular dispensing tray positioned beneath the shelf, segmental portions of which extend beyond the margins of the triangular shelf to afford limited access thereto.

3. A chicken watering fountain or the like, including a plurality of spaced legs and an interconnecting ring for supporting an inverted jug in upright position, and a triangular shelf supported on the legs in spaced relation with the lower ends thereof and having a centrally disposed key hole slot therein through which the neck and ring handle of a conventional jug may project into communication with a circular dispensing tray beneath the shelf, the triangular shape of the latter limiting access to segmental portions of the tray which project beyond the margins of the shelf.

4. In a chicken watering fountain or the like, a reservoir comprising an inverted conventional jug having a reduced neck and integral ring handle, a supporting rack therefor including a polygonal shelf having a centrally disposed key hole slot therein through which the neck of the jug projects, and a circular dispensing tray beneath the shelf with which the neck of the jug communicates, including marginal portions projecting beyond the margins of the shelf to afford limited access thereto.

5. A chicken watering fountain or the like, including a reservoir comprising an inverted conventional small mouth jug having a ring handle, a supporting rack therefor, a circular dispensing tray with which the mouth of the inverted jug communicates, and a duofunctional triangular shelf carried by the rack having therein a key hole slot to receive the neck and handle of the jug, supporting the jug in inverted position and covering the tray to exclude debris, except within marginal segmental areas thereof through which access is afforded to the tray, said reservoir jug being adapted to support a duofunctional funnel usable for filling the reservoir jug detachably engageable upon the upper end of the inverted reservoir jug for excluding chickens from roosting thereon.

6. In a chicken watering fountain assembly or the like, wherein an inverted conventional jug having an integral ring handle is employed as a reservoir, a support therefor, including an elevated rest for the jug having centrally disposed therein a substantially key hole shaped slot through which the neck of the jug may project into a dispensing tray positioned beneath the rest.

7. A chicken watering fountain assembly or the like, wherein water is automatically supplied from an elevated reservoir to a circular dispensing tray, including a triangular cover for the dispensing tray beyond the margins of which segmental portions of the dispensing tray project to afford access thereto, the polygonal cover serving to exclude litter and debris from the tray.

NICHOLAS J. MARSHALL.